US010255179B2

(12) United States Patent
Ji et al.

(10) Patent No.: US 10,255,179 B2
(45) Date of Patent: Apr. 9, 2019

(54) GARBAGE COLLECTION READ THROTTLING

(71) Applicant: WESTERN DIGITAL TECHNOLOGIES, INC., Irvine, CA (US)

(72) Inventors: YungLi Ji, Irvine, CA (US); Yun-Tzuo Lai, Irvine, CA (US); Haining Liu, Irvine, CA (US); Ming-Yu Tai, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 162 days.

(21) Appl. No.: 15/396,361

(22) Filed: Dec. 30, 2016

(65) Prior Publication Data

US 2018/0189175 A1 Jul. 5, 2018

(51) Int. Cl.
*G06F 3/06* (2006.01)
*G06F 12/02* (2006.01)

(52) U.S. Cl.
CPC ........ G06F 12/0253 (2013.01); G06F 3/0611 (2013.01); G06F 3/0659 (2013.01); G06F 3/0679 (2013.01); G06F 12/0246 (2013.01); *G06F 2212/7205* (2013.01)

(58) Field of Classification Search
CPC ............. G06F 12/0253; G06F 12/0246; G06F 2212/7205; G06F 3/0604; G06F 3/0653; G06F 3/0634; G06F 3/0656; G06F 3/0679
See application file for complete search history.

(56) References Cited

U.S. PATENT DOCUMENTS

| 8,725,931 | B1* | 5/2014 | Kang | .................. | G06F 12/0246 |
| | | | | | 710/52 |
| 8,775,720 | B1* | 7/2014 | Meyer | .................. | G06F 3/0659 |
| | | | | | 711/103 |
| 9,021,192 | B1* | 4/2015 | Kang | .................. | G06F 12/0253 |
| | | | | | 711/100 |
| 2007/0033376 | A1* | 2/2007 | Sinclair | ................. | G06F 3/0605 |
| | | | | | 711/203 |
| 2016/0117105 | A1* | 4/2016 | Thangaraj | ............. | G06F 3/0616 |
| | | | | | 711/103 |
| 2016/0313944 | A1* | 10/2016 | Hodgdon | ................ | G06F 3/061 |
| 2017/0160953 | A1* | 6/2017 | Hirata | .................. | G06F 3/0611 |
| 2017/0285945 | A1* | 10/2017 | Kryvaltsevich | ......... | G06F 3/061 |

* cited by examiner

*Primary Examiner* — Michael Krofcheck
(74) *Attorney, Agent, or Firm* — Morgan, Lewis & Bockius LLP (57) ABSTRACT

A device that provides garbage collection read throttling includes at least one processor that is configured to receive a request to perform a garbage collection read command on one of a plurality of flash memory circuits. The at least one processor is configured to determine whether garbage collection read throttling is enabled, such as when a garbage collection read throttling criterion is satisfied. The at least one processor is configured to buffer the garbage collection read command when garbage collection read throttling is enabled and perform the garbage collection read command when garbage collection read throttling is disabled. When the garbage collection read throttling is enabled and the garbage collection read command is buffered, the at least one processor is configured to perform the buffered garbage collection read command when garbage collection read throttling is subsequently disabled.

19 Claims, 4 Drawing Sheets

GARBAGE COLLECTION READ THROTTLING

TECHNICAL FIELD

The present description relates generally to garbage collection for flash memory devices including garbage collection read command throttling for flash memory devices.

BACKGROUND

In a flash memory system, garbage collection is performed to allow pages that have been marked invalid (e.g., due to a deletion) to be erased and subsequently written to again. For example, when a block includes multiple invalid pages as well as one or more valid pages, a garbage collection read command may be used to retrieve the data from the valid pages of the block. A garbage collection write command may then be used to write the data retrieved from the valid pages to one or more pages of one or more other blocks. The entire block from which the data was retrieved may then be erased and made available to be written to again.

SUMMARY

The disclosed subject matter relates to a device that includes at least one processor. The at least one processor may be configured to receive a request to perform a garbage collection read command on one of a plurality of flash memory circuits. The at least one processor may be further configured to determine whether a garbage collection read throttling criterion is satisfied. The at least one processor may be further configured to hold the garbage collection read command when the garbage collection read throttling criterion is satisfied, otherwise perform the garbage collection read command.

In another aspect, a system may include flash memory circuits each comprising blocks, each of the blocks including one or more pages, a random access memory (RAM) configured to store a garbage collection read command queue that contains outstanding garbage collection read commands, an interface communicatively coupled to a host device, and a controller. The controller may be communicatively coupled to the flash memory circuits via a channel and the controller may be configured to receive a request to perform a garbage collection read command that identifies at least one of the one or more pages of at least one of the blocks of at least one of the flash memory circuits. The controller may be further configured to determine whether a garbage collection read throttling criterion is satisfied based at least in part on a number of the outstanding garbage collection read commands contained in the garbage collection read command queue. The controller may be further configured to buffer the garbage collection read command in the RAM when the garbage collection read throttling criterion is satisfied, otherwise transmit, over the channel, the garbage collection read command to the one of the flash memory circuits and storing the garbage collection read command in the garbage collection read command queue.

In another aspect, a method may include monitoring a number of outstanding read commands in a garbage collection read command queue. The method may further include, when the number of outstanding read commands in the garbage collection read command queue exceeds a threshold number of outstanding read commands, enabling garbage collection read command throttling. The method may further include, when the number of outstanding read commands in the garbage collection read command queue drops below the threshold number of outstanding read commands, disabling the garbage collection read command throttling. The method may further include buffering, in a buffer, received garbage collection read commands when the garbage collection read command throttling is enabled, and performing the received garbage collection read commands when the garbage collection read command throttling is disabled.

In another aspect, a system may include means for receiving requests to perform garbage collection read commands on a plurality of flash memory circuits. The system may further include means for determining whether garbage collection read throttling is enabled. The system may further include means for performing the garbage collection read commands when the garbage collection read throttling is disabled. The system may further include means for waiting to perform the garbage collection read commands until the garbage collection read throttling is disabled when the garbage collection read throttling is enabled.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, garbage collection read throttling may be enabled when a garbage collection read throttle criterion is satisfied. The garbage collection read throttle criterion may be satisfied, for example, when a number of outstanding garbage collection read commands exceeds a threshold number, when a number of individual flash memory circuits that have outstanding garbage collection read commands exceeds a threshold number, and/or when a throughput of the garbage collection read commands exceeds a threshold throughput. When the garbage collection read throttling is enabled, any received garbage collection read commands are buffered until the garbage collection read throttling is disabled, at which time the buffered garbage collection read commands may be processed from the buffer in a first-in-first-out fashion. In this manner, the subject system avoids overloading the throughput, processing, and/or other resource constraints of the flash memory system with garbage collection read commands and the garbage collection write commands that result.

Figure 1:
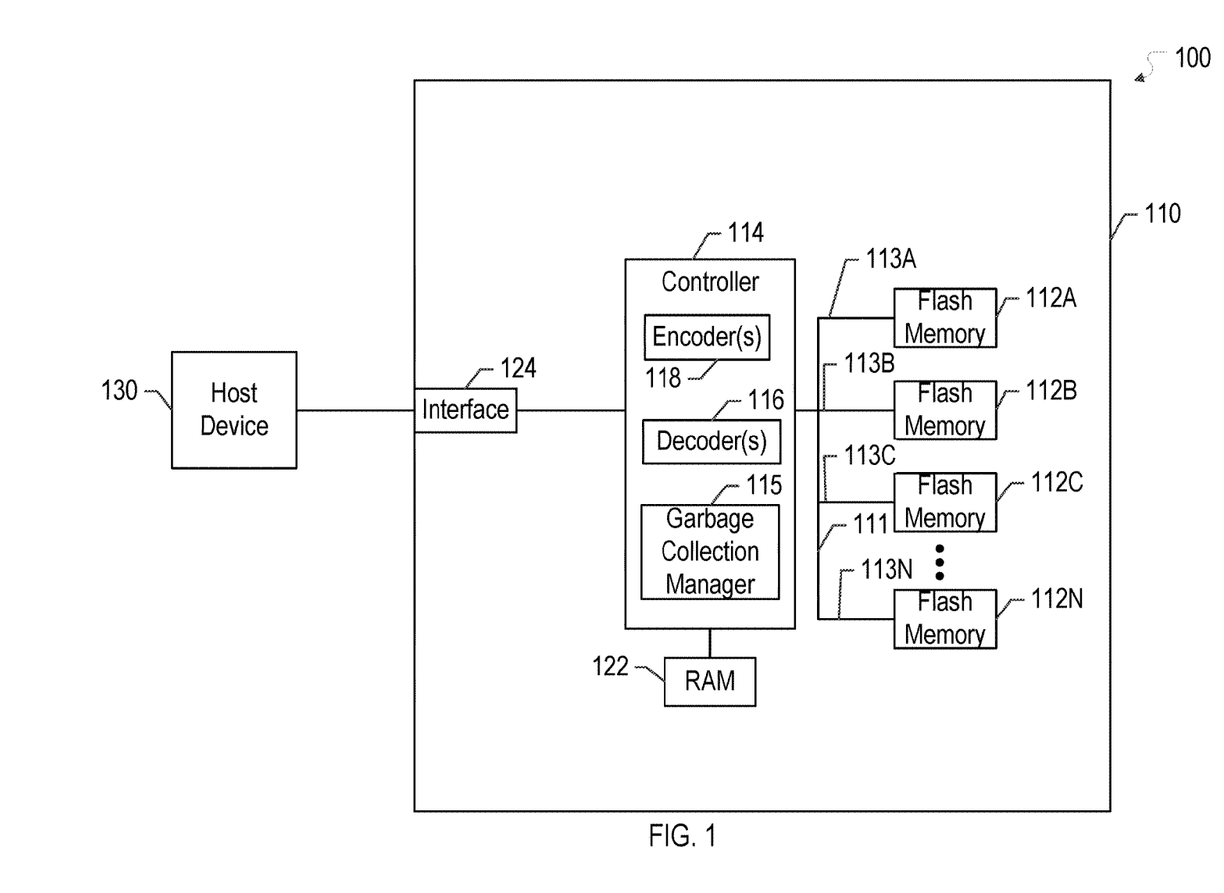
FIG. 1 illustrates an example flash memory system that may implement a system for garbage collection read throttling in accordance with one or more implementations.

FIG. 1 illustrates an example flash memory system 100 that may implement a system for garbage collection read throttling in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a flash memory device 110 and a host device 130. The flash memory device 110 includes a bus 111, one or more flash memory circuits 112A-N, one or more channels 113A-N, a controller 114, a random access memory (RAM) 122 and an interface 124. The controller 114 includes one or more decoders 116, such as error-correcting code (ECC) decoders, one or more encoders 118, such as ECC encoders, and the garbage collection manager 115. The one or more decoders 116, the one or more encoders 118, and/or the garbage collection manager 115 may be one or more dedicated circuits of the controller 114, may be implemented via firmware running on the controller 114, and/or may be one or more circuits separate from the controller 114.

The interface 124 of the flash memory device 110 couples the flash memory device 110 to the host device 130. The interface 124 may be a wired interface, such as a Personal Computer Memory Card International Association (PCMCIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The channels 113A-N may be individually coupled to the bus 111 and the channels 113A-N may each communicatively couple one or more of the flash memory circuits 112A-N to the controller 114 by way of the bus 111. In one or more implementations, the channels 113A-N may be directly coupled to the controller 114, e.g., without the bus 111. The channels 113A-N and/or the bus 111 may be wired interfaces, such as the wired interfaces discussed above with respect to the interface 124 and/or other wired interfaces.

In the system 100, the channel 113A is communicatively coupled to the flash memory circuit 112A, the channel 113B is communicatively coupled to the flash memory circuit 112B, the channel 113C is communicatively coupled to the flash memory circuit 112C, and the channel 113N is communicatively coupled to the flash memory circuit 112N.

Although the channels 113A-N are illustrated in the system 100 as each being communicatively coupled to one of the flash memory circuits 112A-N, each of the channels 113A-N may be communicatively coupled to multiple of the flash memory circuits 112A-N as is discussed further below with respect to FIG. 2. When multiple of the flash memory circuits 112A-N are coupled to a single one of the channels 113A-N, only one of the flash memory circuits 112A-N may be able to transmit or receive data over the channel at any given time.

The bus 111 and/or the channels 113A-N may each be associated with a maximum bandwidth and/or throughput. Similarly, the interface 124 may also be associated with a maximum bandwidth and/or throughput. Thus, there may be bandwidth/throughput limitations on the amount of data that can be transferred over the bus 111 and/or over each of the channels 113A-N at any given time. Furthermore, each of the flash memory circuits 112A-N may only be capable of processing a single command, e.g. a write command or a read command, at any given time.

The controller 114 is operable to read data from, and write data to, the flash memory circuits 112A-N via the channels 113A-N and the bus 111. For example, the controller 114 receives data, such as a stream of data, from the host device 130 via the interface 124, where the data is then written to one or more of the flash memory circuits 112A-N via the bus 111 and one or more of the channels 113A-N. The flash memory circuits 112A-N may each include one or more physical blocks, such as NAND blocks and/or NOR blocks. The physical blocks may each include one or more physical pages to which data may be written to or read from.

The controller 114 may utilize the RAM 122 to assist with reading/writing data to/from the flash memory circuits 112A-N. For example, the RAM 122 may be used as a buffer for rate control, or may otherwise be used to store information (e.g., queues, variables, physical block status, logical to physical address mapping tables, endurance/retention data, settings, etc.) utilized by the controller 114 to read/write data to/from the flash memory circuits 112A-N. Since the RAM 122 may be volatile memory, the controller 114 may permanently store information in one or more of the flash memory circuits 112A-N. When the flash memory device 110 is powered on, the controller 114 may retrieve the information from the one or more flash memory circuits 112A-N and store the information in the RAM 122.

Although the physical pages of the blocks of the flash memory 112A-D can be individually written to, the physical pages of the blocks of the flash memory 112A-D cannot be individually erased. Instead, a page of a block can only be erased, and subsequently rewritten to, by erasing all of the pages of the block. Thus, as data is moved from a page of a block, or the data is deleted, the page is marked invalid and cannot be reused until the entire block is erased. Accordingly, the garbage collection manager 115 operates to free blocks that include invalid pages for reuse by moving any data from valid pages in the block to another block(s), and then erasing the entire block.

For example, when the garbage collection manager 115 identifies a block of one of the flash memory circuits 112A-N, such as the flash memory circuit 112A, that includes invalid pages, the garbage collection manager 115 transmits a garbage collection read command to the flash memory circuit 112A over the bus 111 and the channel 113A, and adds the garbage collection read command (and/or an indicator thereof) to an outstanding garbage collection read command queue. The garbage collection read command may identify one or more valid pages of a block of the flash memory circuit 112A to read the data from. The flash memory circuit 112A receives the garbage collection read command and processes the command when resources are available. Since the flash memory circuit 112A may only be able to process one command at a time, the command may be processed by the flash memory circuit 112A when it is received or may be processed some amount of time after it is received, e.g., if the flash memory circuit is already processing other commands. When the command is processed, the flash memory circuit 112A reads the data from the identified pages and may transmit the data to the garbage collection manager 115 via the channel 113A and the bus 111. Alternatively and/or in addition, the flash memory circuit 112A may write the data to pages of another block of the flash memory circuit 112A, if such a block is available.

The garbage collection manager 115, upon receipt of the data or an indication that the data has been moved to another block by the flash memory circuit 112A, removes the garbage collection read command from the outstanding garbage collection read command queue. When the garbage collection manager 115 receives the data, the garbage collection manager 115 forwards the data to another of the flash memory circuits 112B-N for writing to one or more other pages of one or more other blocks, and the controller 114 updates the logical to physical address mapping table.

While the garbage collection manager 115 is transmitting garbage collection read and/or write commands to the flash memory circuits 112A-N over the bus 111 and the channels 113A-N, the host device 130 may also be transmitting read and/or write commands to the flash memory circuits 112A-N over the bus 111 and the channels 113A-N, which may be referred to as front-end reads and writes. The controller 114 may utilize a write credit to balance the write commands initiated by the host device 130 and those issued by the garbage collection manager 115. The write credit may indicate an amount of bandwidth, e.g., of the bus 111 and/or of one or more of the channels 113A-N that can be utilized by the host device 130 and the garbage collection manager 115 at any given time. When the host device 130 transmits only read commands to the flash memory circuits 112A-N, the garbage collection manager 115 of the flash memory device 110 may not need to erase any blocks or provide additional blocks for writing (since the host device 130 is only transmitting read commands). Thus, when the host device 130 is only transmitting read commands, the garbage collection manager 115 may temporarily stop transmitting any commands to the flash memory circuits 112A-N, e.g., to provide a better read throughput and response time for the host device 130.

In one or more implementations, the write credit may be set as a percentage, such as 50%. In this instance, the host device 130 and the garbage collection manager 115 may each be allowed to utilize half of the available bandwidth for write commands, or in other words the host device 130 and the garbage collection manager 115 may operate at the same throughput. The controller 114 may be preconfigured with a particular quality of service that necessitates having a minimum number of free blocks across the flash memory circuits 112A-N at any given time. Thus, if the number of free blocks begins to reach and/or fall below the minimum number of free blocks, the controller 114 may adjust the write credit to allow the garbage collection manager 115 to perform more writes in order to move data out of blocks that can then be erased thereby increasing the number of free blocks.

In one or more implementations, the write credit may further account for the maximum speed or bandwidth that can be supported by the flash memory circuits 112A-N, the channels 113A-N and/or the bus 111. For example, if the flash memory circuits 112A-N can support 100 MB/s bandwidth, and the garbage collection manager 115 only needs to utilize 5 MB/s in order to support the bandwidth utilization of the host device 130 (e.g., 3 MB/s), the garbage collection manager 115 may be allowed to utilize the extra available bandwidth to free up additional blocks for future use.

Thus, the write credit allows the controller 114 to control the number of write commands by the host device 130 and the garbage collection manager 115, and the bandwidth utilization associated therewith. However, when the garbage collection manager 115 and/or the host device 130 are only processing a small number of write commands, the garbage collection manager 115 may be allowed to utilize available processing and memory resources to issue garbage collection read commands, e.g. as discussed above with respect to additional available bandwidth. Although the garbage collection read commands consume a very small amount of the bandwidth, e.g., on the bus 111 and/or one or more of the channels 113A-N, the resulting write commands may consume a much larger amount of the bandwidth. Thus, once the garbage collection read commands are serviced by the respective flash memory circuits 112A-N, there may be a spike in the number of garbage collection write commands that need to be performed. These additional write commands may not be reconcilable with the write credit and therefore may overwhelm the bandwidth of the system 100 thereby causing poor/slower performance with respect to read and/or write commands issued by the host device 130.

The subject system utilizes garbage collection read command throttling in order to prevent the garbage collection manager 115 from issuing a significant number of read commands over any given time period, such as when additional bandwidth is available, thereby preventing the subsequent influx of a significant number of write commands that may overwhelm the bandwidth of the bus 111, the one or more of the channels 113A-N, and/or the one or more flash memory circuits 112A-N. In the subject system, when a garbage collection read throttling criterion is satisfied, garbage collection read throttling is enabled. The garbage collection read throttling criterion may be satisfied, for example, when at least a threshold number of outstanding garbage collection read commands are in the garbage collection read command queue, when at least a threshold number of different flash memory circuits 112A-N have outstanding garbage collection read commands in the garbage collection read command queue, when the garbage collection read throughput exceeds a threshold, or generally when any criterion is met that indicates that a significant number of garbage collection read commands have been issued.

When the garbage collection read throttling is enabled, garbage collection read commands are held by the garbage collection manager 115 rather than transmitting the garbage collection read commands to the appropriate flash memory circuits 112A-N. For example, the garbage collection manager 115 may store the garbage collection read commands in a buffer, such as in an on-chip buffer and/or in the RAM 122. The garbage collection manager 115 continuously monitors the garbage collection read throttling criterion to determine when the garbage collection read throttling can be disabled and/or when the garbage collection read throttling should be re-enabled.

Upon disabling the garbage collection read throttling, the garbage collection manager 115 begins to process the garbage collection read commands stored in the buffer, such as by transmitting the garbage collection read commands to the appropriate flash memory circuit 112A-N. The garbage collection manager 115 may process the garbage collection read commands in the buffer in a first-in-first-out fashion. The garbage collection manager 115 may continue to buffer read commands in the buffer, after the garbage collection read throttling has been disabled, until the buffer has been emptied. The garbage collection read throttling criterion and the garbage collection read throttling are discussed further below with respect to FIG. 4.

In one or more implementations, one or more of the controller 114, the garbage collection manager 115, the decoder 116, the encoder 118, and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 2:
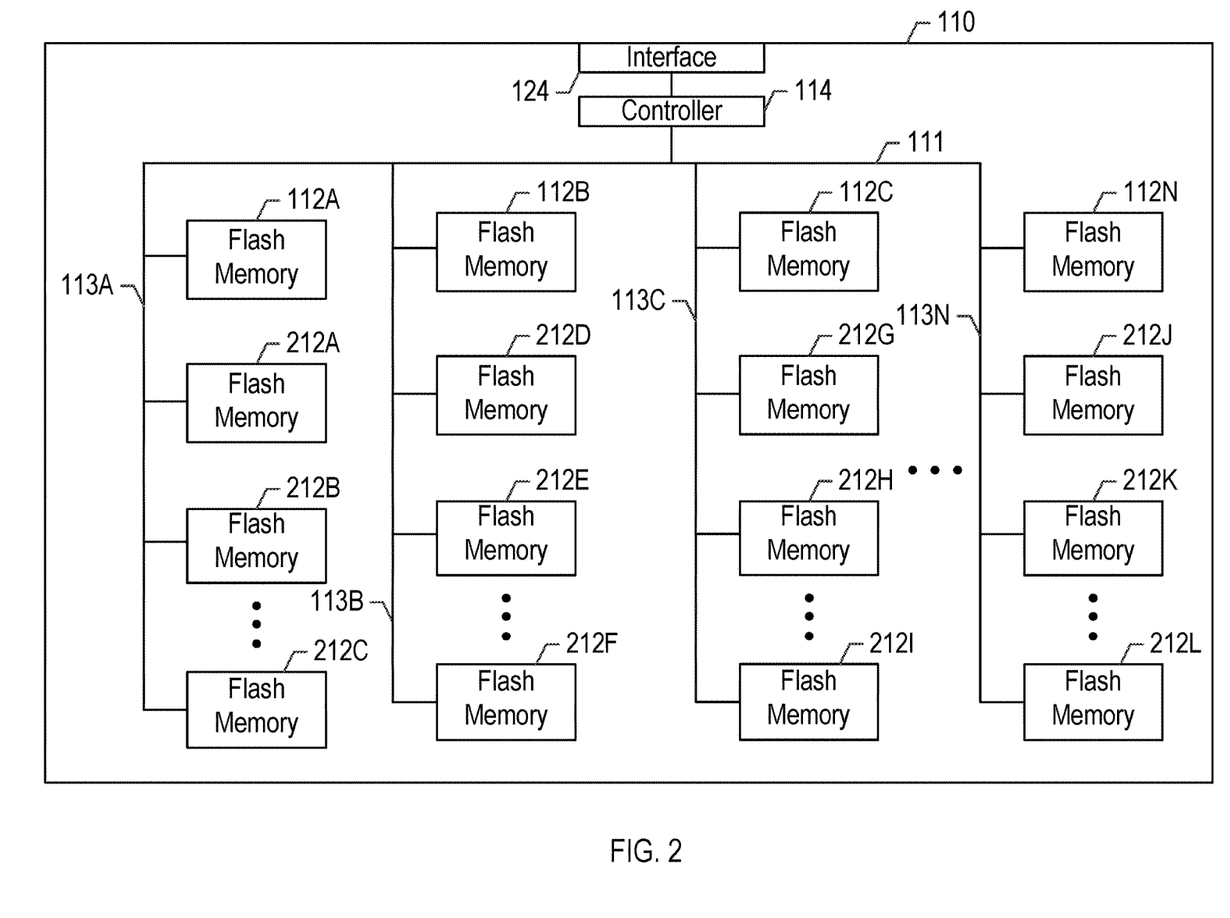
FIG. 2 illustrates example flash memory circuits distributed across different channels in an example flash memory device in accordance with one or more implementations.

FIG. 2 illustrates example flash memory circuits distributed across different channels in an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example flash memory device 110 includes the interface 124, the controller 114, the bus 111, the one or more channels 113A-N, and one or more flash memory circuits 112A-N and 212A-L. The flash memory circuits 112A-N each include one or more physical blocks of flash memory, which may also be referred to as blocks and are discussed further below with respect to FIG. 3.

As shown in FIG. 2, the channel 113A couples the flash memory circuits 112A and 212A-C to the bus 111, the channel 113B couples the flash memory circuits 112B and 212D-F to the bus 111, the channel 113C couples the flash memory circuits 112C and 212G-I to the bus 111, and the channel 113N couples the flash memory circuits 112N and 212J-L to the bus 111. Thus, when data is being communicated over the channel 113A to/from one of the flash memory circuits 112A, 212A-C, such as the flash memory circuit 112A, the other flash memory circuits 212A-C may be unable to transmit or receive data over the channel 113A during this period of time, which may be, for example, a fraction of a millisecond. However, after the flash memory circuit 112A receives the data, the flash memory circuit 112A may be in a busy state during which the flash memory circuit 112A may not receive any additional read and/or write commands. During the period of time when the flash memory circuit 112A is in the busy state, which may be, for example, 2 milliseconds, one or more of the other flash memory circuits 212A-C may transmit data over the channel 113A. Thus, the number of the flash memory circuits 112A-N and 212A-L that are simultaneously in the busy state may limit the flash memory device 110. The other channels 113B-N may operate in a similar fashion.

For explanatory purposes, the flash memory device 110 of FIG. 2 is illustrated as including four channels 113A-N, and each of the channels 113A-N is illustrated as being communicatively coupled to four of the flash memory circuits 112A-N, 212A-L. However, the flash memory device 110 may include any number of channels, such as 8, 16, 32, or generally any number. Similarly, each of the channels 113A-N may be communicatively coupled to any number of the flash memory circuits 112A-N, 212A-L, such as 7, 15, 31, or generally any number. In one or more implementations, one or more of the channels 113A-N may be communicatively coupled to different numbers of the flash memory circuits 112A-N, 212A-L.

In one or more implementations, one or more of the controller 114 and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 3:
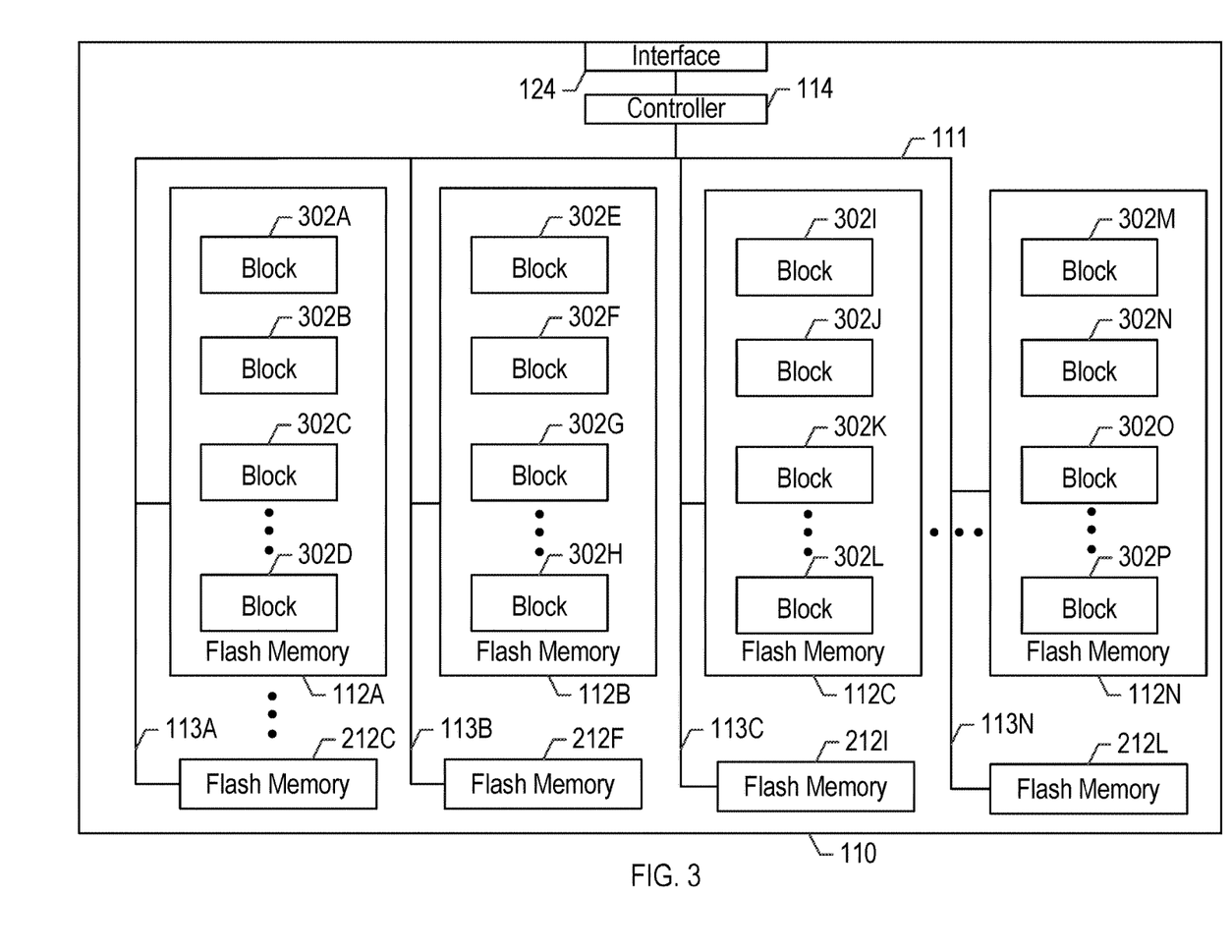
FIG. 3 illustrates example blocks of flash memory circuits distributed across different channels in an example flash memory device in accordance with one or more implementations.

FIG. 3 illustrates example blocks of flash memory circuits distributed across different channels in an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example flash memory device 110 includes the interface 124, the controller 114, the bus 111, the channels 113A-N, and one or more flash memory circuits 112A-N and 212C,F,I,L. The flash memory circuits 112A-N each include one or more physical blocks 302A-P of flash memory, which may also be referred to as blocks 302A-P. The other flash memory circuits 212C,F,I,L also include blocks (not shown). The flash memory circuit 112A includes the blocks 302A-D, the flash memory circuit 112B includes the blocks 302E-H, the flash memory circuit 112C includes the blocks 3021-L, and the flash memory circuit 112N includes the blocks 302M-P. Each of the blocks 302A-P may include one or more physical pages of flash memory. The individual physical pages of the blocks 302A-P may be the smallest unit that can be written to in the flash memory circuits 112A-N and may be, for example, 8-16 kilobytes in size. In one or more implementations, a flash memory circuit 112A may be 16 Gigabytes in size and may include 4,252 blocks each of which includes 256 pages with each page storing 17,760 bytes.

In one or more implementations, one or more of the controller 114 and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 4:
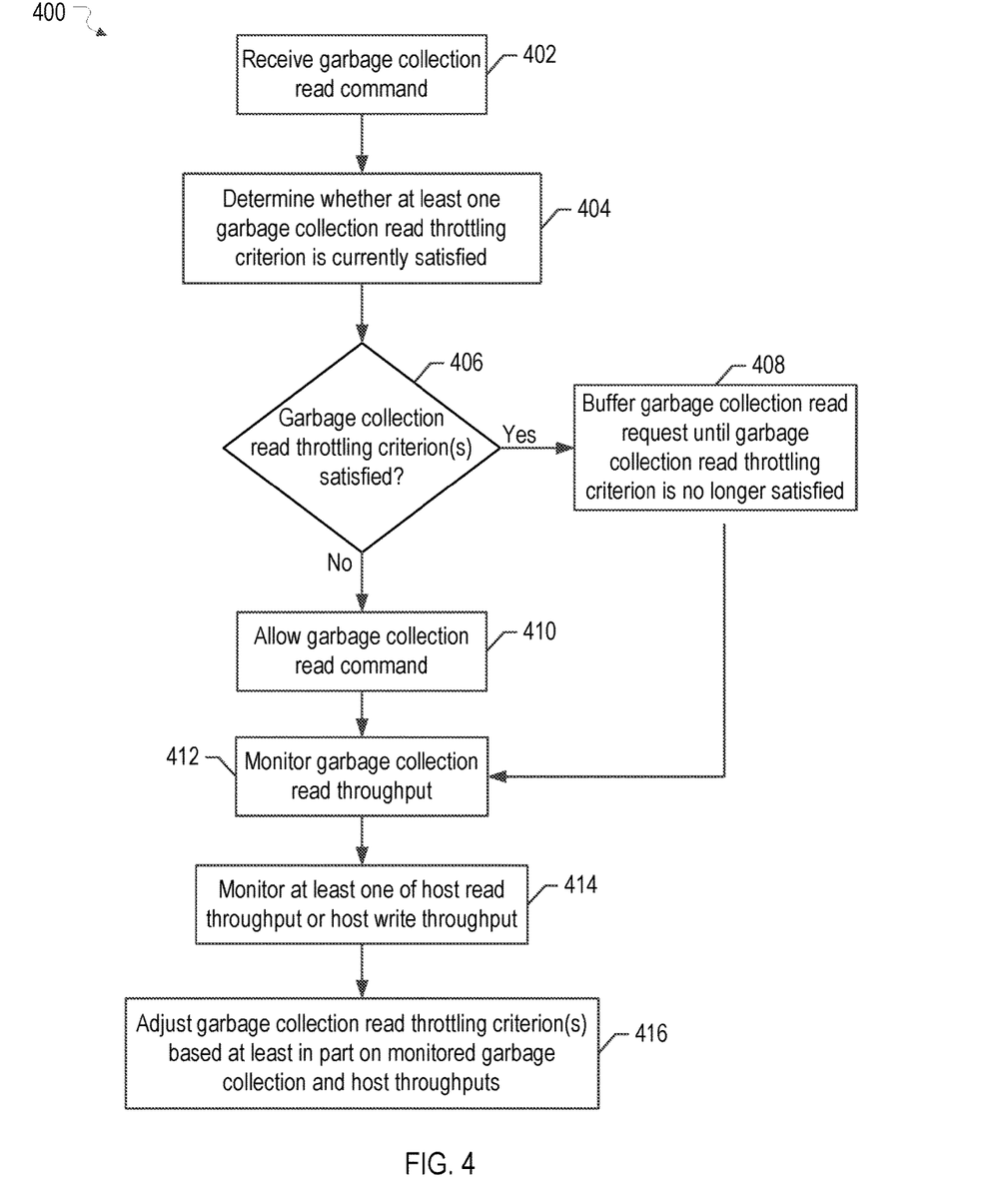
FIG. 4 illustrates a flow diagram of an example process of garbage collection read throttling in accordance with one or more implementations.

FIG. 4 illustrates a flow diagram of an example process 400 of garbage collection read throttling in accordance with one or more implementations. For explanatory purposes, the example process 400 is described herein with reference to the garbage collection manager 115 of FIG. 1; however, the example process 400 is not limited to the garbage collection manager 115 of FIG. 1, and one or more blocks of the example process 400 may be performed by one or more other components of the garbage collection manager 115 and/or the controller 114. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The example process 400 begins when the garbage collection manager receives a garbage collection read command for transmission to one of the flash memory circuits 112A-N (402). The garbage collection read command may be initiated or issued by a process that is performing the garbage collection management, such as within the garbage collection manager 115. The garbage collection manager 115 then determines whether at least one garbage collection read throttling criterion is currently satisfied and/or whether garbage collection read throttling is currently enabled (404). For example, the garbage collection manager 115 may be continuously evaluating the garbage collection read throttling criterion and may set a flag to indicate whether the garbage collection read throttling is enabled or disabled. Alternatively, and/or in addition, the garbage collection manager 115 may evaluate the garbage collection read throttling criterion when garbage collection read commands are received for transmission to one of the flash memory circuits 112A-N.

The garbage collection read throttling criterion may be based on, for example, the total number of outstanding garbage collection read commands in the garbage collection read command queue. For example, if the total number of outstanding garbage collection read commands in the queue exceeds 10 read commands, 100 read commands, or generally any number of read commands, then the garbage collection read throttling criterion may be satisfied.

The garbage collection read throttling criterion may also be based on, for example, the total number of the flash memory circuits 112A-N, 212A-L for which data is to be read by at least one of the outstanding garbage collection read commands in the queue. For example, if the number of the different flash memory circuits 112A-N, 212A-L for which data is to be read from by at least one of the outstanding garbage collection read commands in the queue exceeds a threshold number of the flash memory circuits, such as 8, 15, or generally any number, then the garbage collection read throttling criterion may be satisfied. In one or more implementations, the garbage collection read throttling criterion in this instance may be a on a per channel basis. Thus, there may be a different garbage collection read throttling criterion for each of the channels 113A-N which may be used to enable/disable garbage collection read throttling on a per channel basis.

The garbage collection read throttling criterion may also be based on, for example, the throughput of the garbage collection read commands. For example, the garbage collection manager 115 may monitor how quickly the garbage collection read commands are being serviced by the flash memory circuits 112A-N, 212A-L, such as based on how quickly a response is received from the flash memory circuits 112A-N, 212A-L indicating that the read command has been performed, such that the garbage collection read command can be removed from the queue. If the throughput of the garbage collection read commands exceeds a threshold throughput, then the garbage collection read throttling criterion may be satisfied. The garbage collection manager 115 may update the throughput of the garbage collection read commands at any interval, such as one millisecond, one second, or generally any interval. However, the interval may be set to ensure that the controller 114 is continuously able to provide a preconfigured quality of service (e.g. read and/or write speed/bandwidth) to the host device 130.

When the garbage collection manager 115 determines that the garbage collection read throttling criterion is satisfied (and/or that the garage collection read throttling is enabled) (406), the garbage collection manager 115 buffers, or holds, the garbage collection read command until the garbage collection read throttling criterion is no longer satisfied (and/or the garbage collection read throttling is disabled) (408). For example, the garbage collection manager 115 may store the garbage collection read command in a buffer. The garbage collection manager 115 may also store subsequently received garbage collection read commands in the buffer while the garbage collection read throttling criterion is satisfied. Once the garbage collection read throttling criterion is no longer satisfied (or the garbage collection read throttling is disabled), the garbage collection read commands are processed from the buffer in a first-in-first-out fashion. Any additional read commands that are received before the buffer is emptied are added to the end of the buffer until the buffer is emptied.

When the garbage collection manager 115 determines that the garbage collection read throttling criterion is not satisfied (and/or that the garbage collection read throttling is disabled) (406), the garbage collection manager 115 allows the garbage collection read command to be transmitted to the appropriate one of the flash memory circuits 112A-N, 212A-L (410).

The garbage collection manager 115 may also continuously monitor the throughput of the garbage collection read commands (412). Furthermore, the garbage collection manager 115 and/or the controller 114 may monitor the current read and/or write speed, amount, and/or throughput of the host device 130 (414). The garbage collection manager 115 may adjust the garbage collection throttling criterion based on the monitored garbage collection and/or host throughputs (416).

For example, the garbage collection throttling criterion may be adjusted in order to match the throughput of the garbage collection read commands to the read or write speed, amount, and/or throughput of the host device 130. In one or more implementations, the garbage collection throttling criterion may also be adjusted to reflect changes in the write credit. For example, the garbage collection throttling criterion may be adjusted to conform the ratio of the garbage collection read command throughput to the read or write throughput of the host device 130 to the ratio indicated by the write credit.

In one or more implementations, the garbage collection throttling criterion may be satisfied when the aforementioned thresholds are exceeded by more than a threshold amount. In other words, the garbage collection manager 115 may be given some tolerance with respect to the garbage collection read throttling criterion, for example, such that the garbage collection read throughput is faster than the write throughput of the host device 130 by some threshold margin when the write credit is an equal 50/50, such as 10% faster, 20% faster, or generally any amount faster.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
   receive a request to perform a garbage collection read command on one of a plurality of flash memory circuits;
   determine whether a garbage collection read throttling criterion is satisfied;
   hold the garbage collection read command when the garbage collection read throttling criterion is satisfied; and
   when the garbage collection read throttling criterion is not satisfied, perform the garbage collection read command by:
   transmitting the garbage collection read command to the one of the plurality of flash memory circuits; and
   adding the transmitted garbage collection read command to an outstanding garbage collection read command queue,
   wherein the garbage collection read throttling criterion is based on the outstanding garbage collection read command queue.

2. The device of claim 1, wherein the at least one processor is further configured to:
   hold the garbage collection read command until the garbage collection read throttling criterion is no longer satisfied.

3. The device of claim 2, wherein the at least one processor is configured to hold the garbage collection read command by storing the garbage collection read command in a buffer.

4. The device of claim 3, wherein the at least one processor is communicatively coupled to the plurality of flash memory circuits via a channel.

5. The device of claim 1, wherein the at least one processor is configured to determine whether the garbage collection read throttling criterion is satisfied by determining whether a number of garbage collection read commands in the outstanding garbage collection read command queue exceeds a threshold number of garbage collection read commands.

6. The device of claim 1, wherein the at least one processor is configured to determine whether the garbage collection read throttling criterion is satisfied by determining whether a number of the plurality of flash memory circuits associated with at least one of the garbage collection read commands in the outstanding garbage collection read command queue exceeds a threshold number of the plurality of flash memory circuits.

7. The device of claim 1, wherein the garbage collection read command identifies at least one page of at least one block of the one of the plurality of flash memory circuits and the at least one processor is further configured to:
   receive, from the one of the plurality of flash memory circuits, a data item stored in the at least one page of the at least one block of the one of the plurality of flash memory circuits; and
   remove the garbage collection read command from the outstanding garbage collection read command queue.

8. The device of claim 4, wherein the at least one processor is configured to determine whether the garbage collection read throttling criterion is satisfied by determining whether a garbage collection read command throughput exceeds a garbage collection read command throughput threshold.

9. The device of claim 8, wherein the at least one processor is further configured to:
   adjust the garbage collection read command throughput based at last in part on a host read throughput or a host write throughput.

10. A system comprising:
    flash memory circuits each comprising blocks, each of the blocks including one or more pages;
    a random access memory (RAM) configured to store a garbage collection read command queue that contains outstanding garbage collection read commands transmitted to the flash memory circuits;
    an interface configured to be communicatively coupled to a host device; and
    a controller communicatively coupled to the flash memory circuits via a channel, the controller configured to:
    receive a request to perform a garbage collection read command that identifies at least one of the one or more pages of at least one of the blocks of at least one of the flash memory circuits;
    determine whether a garbage collection read throttling criterion is satisfied based at least in part on a number of the outstanding garbage collection read commands contained in the garbage collection read command queue; and
    buffer the garbage collection read command in the RAM when the garbage collection read throttling criterion is satisfied, otherwise transmit, over the channel, the garbage collection read command to the one of the flash memory circuits and storing the garbage collection read command in the garbage collection read command queue.

11. The system of claim 10, wherein the controller is further configured to:
    receive, from the one of the flash memory circuits and over the channel, at least one data item associated with the garbage collection read command; and
    remove the garbage collection read command from the garbage collection read command queue responsive to receipt of the at least one data item.

12. The system of claim 11, wherein the controller is further configured to:
    transmit the at least one data item to be written to at least one of the one or more pages of at least one of the blocks of at least one of the flash memory circuits.

13. The system of claim 12, where the controller is further configured to:
    determine that the garbage collection read throttling criterion is satisfied when a number of the outstanding garbage collection read commands stored in the garbage collection read command queue exceeds a threshold number of outstanding garbage collection read commands.

14. The system of claim 13, wherein the controller is further configured to:
    monitor a garbage collection read command throughput associated with performing the outstanding garbage collection read commands;
    monitor a host device throughput associated with reading data from, or writing data to, the flash memory circuits by the host device; and
    adjust the threshold number of outstanding garbage collection read commands based at least in part on the garbage collection read command throughput and the host device throughput.

15. The system of claim 14, wherein the controller is further configured to:
    maintain a write credit that indicates a first percentage of bandwidth of the channel that can be used for write commands by the host device and a second percentage of the bandwidth of the channel that can be used for write commands associated with the outstanding garbage collection read commands.

16. The system of claim 15, wherein the controller is further configured to:
    adjust the threshold number of outstanding garbage collection read commands to conform a ratio of the garbage collection read command throughput relative to the host device throughput to a ratio of the first percentage of the write credit relative to the second percentage of the write credit.

17. A method comprising:
    monitoring a number of outstanding read commands in a garbage collection read command queue;
    when the number of outstanding read commands in the garbage collection read command queue exceeds a threshold number of outstanding read commands, enabling garbage collection read command throttling;
    when the number of outstanding read commands in the garbage collection read command queue drops below the threshold number of outstanding read commands, disabling the garbage collection read command throttling; and
    buffering, in a buffer, received garbage collection read commands when the garbage collection read command throttling is enabled, and performing the received garbage collection read commands when the garbage collection read command throttling is disabled,
    wherein performing the received garbage collection read commands comprises:
        transmitting the received garbage collection read commands to flash memory circuits for processing; and
        adding the transmitted garbage collection read commands to the garbage collection read command queue.

18. The method of claim 17, further comprising:
    when the garbage collection read throttling is disabled after having been enabled:
        performing the garbage collection read commands stored in the buffer in a first-in-first-out fashion until the buffer is empty; and
        continuing to buffer subsequently received garbage collection read commands in the buffer until the buffer is emptied.

19. A system comprising:
    means for receiving requests to perform garbage collection read commands on a plurality of flash memory circuits;
    means for determining whether garbage collection read throttling is enabled based on an outstanding garbage collection read command queue;
    means for performing the garbage collection read commands when the garbage collection read throttling is disabled by transmitting the garbage collection read commands to the plurality of memory circuits for processing and adding the transmitted garbage collection read commands to the outstanding garbage collection read command queue; and
    means for waiting to perform the garbage collection read commands until the garbage collection read throttling is disabled when the garbage collection read throttling is enabled.

* * * * *